United States Patent [19]

Nigrin

[11] 4,311,504
[45] Jan. 19, 1982

[54] METHOD OF COATING GLASS OR CERAMICS WITH A COLORED FRIT
[75] Inventor: Jaroslava M. Nigrin, Corning, N.Y.
[73] Assignee: Corning Glass Works, Corning, N.Y.
[21] Appl. No.: 121,746
[22] Filed: Feb. 15, 1980
[51] Int. Cl.$^3$ ............................................. C03C 17/04
[52] U.S. Cl. ........................................ 65/32; 65/60.51; 65/60.53; 501/22; 501/25; 501/77; 501/79; 501/65; 501/72
[58] Field of Search ............. 65/32, 60 D, 60.51, 65/60.53; 106/54

[56] References Cited

U.S. PATENT DOCUMENTS

| | | | |
|---|---|---|---|
| 2,612,726 | 10/1952 | Nordberg | 65/32 |
| 3,326,702 | 6/1967 | Babcock | 106/54 X |
| 4,106,946 | 8/1978 | Ritze | 106/54 X |
| 4,179,300 | 12/1979 | Sagara | 106/54 X |

Primary Examiner—Arthur D. Kellogg
Attorney, Agent, or Firm—Clinton S. Janes, Jr.

[57] ABSTRACT

This invention is directed to glazes exhibiting a strong yellow-to-brown coloration or a bright red color which are stable at temperatures of 700°–950° C., the latter glazes being stable in non-oxidizing or inert environments. Both glazes utilize frits consisting essentially, in weight percent on the oxide basis as calculated from the batch, of

| | |
|---|---|
| $SiO_2$ | 35–47 |
| $B_2O_3$ | 5.5–9 |
| BaO | 24–42 |
| $TiO_2$ | 1.5–4 |
| $ZrO_2$ | 6–10 |
| $Li_2O$ | 1–5 |
| MgO | 0–5 |
| CaO | 0–4 |
| SrO | 0–8 |
| ZnO | 0–10 |
| $Bi_2O_3$ | 0–8 |
| SrO + MgO + CaO + ZnO + $Bi_2O_3$ | 0–10 |

The yellow-to-brown coloration is produced through the addition of 0.5–10% by weight $Fe_2O_3$ and 0–4% $TiO_2$. The red coloration is produced through the addition of 2–10% cadmium sulfoselenide.

2 Claims, No Drawings

METHOD OF COATING GLASS OR CERAMICS WITH A COLORED FRIT

BACKGROUND OF THE INVENTION

The decorating of glass and ceramic material has been a developing art over the space of hundreds of years. One important mode of such decoration has involved the use of glazes. Glazes are, in essence, vitreous or glassy coatings which not only improve the aesthetic appearance of the articles but also, in the case of ceramic bodies, provide a non-porous, impermeable surface coating therefor. Since the sale of many glass, ceramic, and, more recently, glass-ceramic products and, in particular, those products designed for culinary ware and tableware is highly subject to the visual appearance thereof, research has been continuous to develop ever more attractive surface finishes for such products. In common parlance, glazes are considered to be clear glasses, colored glazes are regarded as clear glasses with colorants dissolved therein, and enamels are deemed to be glazes having pigments suspended therein to impart color thereto. Both glazes and enamels are commonly applied to the surface of a glass, glass-ceramic, or ceramic body in the form of very finely-divided particles or powder, known to the art as "frit", suspended in a volatile vehicle to provide a paste or slurry. The frit is thereafter fired to first remove the vehicle and then at a higher temperature to fuse the powder to form a strongly-adherent, continuous film on the surface of the body.

Colored glasses have been the subject of extensive research with every color of the visible spectrum being produced. *Coloured Glasses*, W. W. Weyl, Dawson's of Pall Mall, London, 1959, is a monograph devoted to a study of the effects of various cations and anions in developing colors in glasses. The interactions between ions to form colors are essentially limitless and are still under investigation even today.

The use of iron with or without the inclusion of titanium to obtain yellow-to-brown colorations in various glass compositions, especially those glasses containing lead, has been practiced for many years. Weyl, supra, devotes a number of pages to such phenomena, e.g., page 108 ff and page 212 ff. Likewise, the development of a bright red coloration in glasses (ruby glasses) via the inclusion of cadmium sulfoselenide in the composition is well known to the art. Inasmuch as glazes are essentially glasses applied as a thin surface coating on a substrate, pigments containing iron and, optionally, titanium have been formulated and sold commercially for additions to frit compositions, as have pigments containing cadmium sulfoselenide.

To be suitable as a glaze, the frit therefor must possess certain physical characteristics among which are: (1) the firing or maturing temperature thereof, i.e., the temperature at which the frit will flow sufficiently to produce a smooth uniform coating on a substrate, must be sufficiently low to prevent thermal deformation of the ware being coated; and (2) the coefficient of thermal expansion thereof must be compatible with that of the substrate to inhibit crazing and/or spalling of the resultant glaze. In the preferred practice, the coefficient of thermal expansion of the frit will be somewhat less than that of the substrate since that circumstance places the coating under compressive stress which, in turn, enhances the mechanical strength of the final product.

The most prevalent, commerically-marketed glazes for decorating glass, glass-ceramic, and ceramic articles have included substantial levels of lead oxide (PbO) therein and, in some instances, cadmium oxide (CdO). Those ingredients have comprised part of the frit compositions for two primary purposes: first, to soften the frit, i.e., to reduce the melting point thereof sufficiently to permit its fusion onto the surface of ware without causing thermal deformation of the ware; and, second, to raise the refractive index of the glaze. CdO has also been utilized as a colorant in some frits. Unfortunately, however, lead and cadmium are extremely toxic such that glazes and enamels containing those metals which are to be used in contact with foods must demonstrate superior resistance to attack by acidic and alkaline materials to preclude the release of any significant amount of those metals. Hence, the Food and Drug Administration (FDA) has promulgated standards for cadmium and lead release which must not be exceeded by surfaces which come into contact with food.

In general, the release of lead and cadmium from glazes, or, stated differently, the chemical durability of the glazes, is a function of the firing temperature employed in the glazing operation. Thus, as a general rule, the higher the firing temperature, the lower will be the level of lead and cadmium release. However, when frits were prepared of lead-containing compositions for coloring with iron+titanium pigments and fired to temperatures in excess of 700° C., the desired strong yellow-to-brown coloration was not developed. Instead, only a washed-out, pale yellow coloration was produced. In like manner, the firing of lead-containing frits with conventional cadmium sulfoselenide pigments at high temperatures did not yield the desired, customary bright red coloration but only dull gray hues.

Lead-containing glazes commonly exhibit high coefficients of thermal expansion, viz., higher than about $85 \times 10^{-7}/°C$. and, frequently, in excess of $90 \times 10^{-7}/°C$. Recent developments, particularly in the field of glass-ceramics, have led to the production of ware suitable for food service applications having coefficients of thermal expansion less than those of the lead-containing glazes. Such products are not compatible with the conventional glazes, Moreover, as noted previously, glazes free from lead would be desirable for surfaces which contact food.

U.S. application Ser. No. 121,745, filed concurrently herewith by the present applicant under the title *Lead-Free and Cadmium-Free Frits*, now U.S. Pat. No. 4,282,035 is directed to compositions essentially free from lead and cadmium and consist essentially, by weight, of

| | |
|---|---|
| $SiO_2$ | 35–47 |
| $B_2O_3$ | 5.5–9 |
| BaO | 24–42 |
| $TiO_2$ | 1.5–4 |
| $ZrO_2$ | 6–10 |
| $Li_2O$ | 1–5 |
| MgO | 0–5 |
| CaO | 0–4 |
| SrO | 0–8 |
| ZnO | 0–10 |
| $Bi_2O_3$ | 0–8 |
| SrO + MgO + CaO + ZnO + $Bi_2O_3$ | 0–10 |

Those frits demonstrate relatively low coefficients of thermal expansion (20°–300° C.) of about $65-75 \times 10^{-7}/°C$. and can be fired onto glass, glass-ceramic, and ceramic substrates at temperatures between about 700°–950° C. The compositions manifest excellent resistance to attack by acids and bases and, where employed as glazed surfaces for use in food service applications, to attack by detergents utilized in commercial dishwashers. The presence of BaO, $TiO_2$, and $ZrO_2$ imparts a high refractive index to the frits, thereby providing a glaze exhibiting a high gloss. Various compatible metal oxides may be added, if desired, to modify the properties thereof. For example, although contrary to the overall purpose of the frits, CdO can be included to raise the refractive index even higher. Their lower coefficients of thermal expansion, when compared with conventional lead-containing frits, have recommended their utility as glazes for the above-mentioned, lower expansion substrate materials. However, the higher temperatures required for maturing such glazes has required an investigation into pigments suitable for imparting colorations thereto.

SUMMARY OF THE INVENTION

I have discovered that strong thermally-stable, yellow-to-brown colors, most commonly orange-to-brownish red colors, can be developed with such frits through additions thereto of 0.5–10% by weight of $Fe_2O_3$ and 0–4% by weight of $TiO_2$. Furthermore, a bright red color can be produced with such frits when mixed with 2–10% by weight cadmium sulfoselenide and fired in a non-oxidizing or inert atmosphere.

DESCRIPTION OF THE PREFERRED EMBODIMENTS

A frit exhibiting a coefficient of thermal expansion (20°–300° C.) of about $66.4 \times 10^{-7}/°C$. was prepared having the following approximate composition, expressed in weight percent on the oxide basis as calculated from the batch, of

| | |
|---|---|
| BaO | 28.57 |
| MgO | 2.50 |
| $Li_2O$ | 3.35 |
| $SiO_2$ | 46.19 |
| $B_2O_3$ | 7.33 |
| $ZrO_2$ | 9.30 |
| $TiO_2$ | 2.76 | and comminuted to pass a No. 325 United States Standard Sieve (44 microns). The resultant powder was blended with 1% by weight $Fe_2O_3$ and 2% by weight of $TiO_2$ in powder form, silk screened onto dinner plates of PYROCERAM ® ware, a glass-ceramic tableware marketed by Corning Glass Works, Corning, New York, having a coefficient of thermal expansion (0°–300° C.) of about $97 \times 10^{-7}/°C$., and the coated plates fired at 750° C. for 15 minutes. The glaze exhibited high gloss and a strong brownish red color.

Where a conventional lead-based frit was combined with $Fe_2O_3$ and $TiO_2$ in like amounts to the above illustrative example and fired onto dinnerware plates of PYROCERAM ® ware under the same conditions, only a very pale yellow hue was observed.

A frit exhibiting a coefficient of thermal expansion (20°–300° C.) of about $66.8 \times 10^{-7}/°C$. was prepared having the following approximate composition, expressed in weight percent on the oxide basis as calculated from the batch, of

| | |
|---|---|
| BaO | 33.86 |
| $SiO_2$ | 40.80 |
| $Li_2O$ | 1.31 |
| ZnO | 4.37 |
| $B_2O_3$ | 6.47 |
| $ZrO_2$ | 8.22 |
| $TiO_2$ | 2.44 |
| CdO | 2.53 | and comminuted to pass a No. 325 U.S. Standard Sieve (44 microns). The fine particles were then mixed with 5% by weight of a powdered commercial cadmium sulfoselenide pigment, silk screened onto dinner plates of PYROCERAM ® ware, and the coated plates fired at 850° C. for 15 minutes in a nitrogen atmosphere. The resulting glaze displayed high gloss and a bright red color.

Firing in other non-oxidizing or inert atmospheres, e.g., argon and helium, or slightly reducing environments, e.g., forming gas (hydrogen + nitrogen) and mixtures of CO and $CO_2$, will also yield bright red colors. Yet, when the glazing is undertaken in air or other oxidizing atmosphere, the red coloration is not thermally stable with only dull gray hues being produced.

A lead-containing frit, an alkali borosilicate frit, and a zinc borosilicate frit were each blended with 5% by weight of the cadmium sulfoselenide pigment and fired onto PYROCERAM ® brand dinner plates in a nitrogen atmosphere in like manner to that described above. Only dull gray colors resulted evidencing the uniqueness of the frits disclosed in Ser. No. 121,745, supra, for the present inventive purposes.

I claim:

1. A method for coating a glass, glass-ceramic, or ceramic body with a glaze exhibiting a bright red coloration which comprises the step of:

(a) mixing a powdered frit consisting essentially, in weight percent on the oxide basis as calculated from the batch, of

| | |
|---|---|
| $SiO_2$ | 35–47 |
| $B_2O_3$ | 5.5–9 |
| BaO | 24–42 |
| $TiO_2$ | 1.5–4 |
| $ZrO_2$ | 6–10 |
| $Li_2O$ | 1–5 |
| MgO | 0–5 |
| CaO | 0–4 |
| SrO | 0–8 |
| ZnO | 0–10 |
| $Bi_2O_3$ | 0–8 |
| $SrO + MgO + CaO + ZnO + Bi_2O_3$ | 0–10 | with 2–10% by weight cadmium sulfoselenide;

(b) applying said mixture to the surface of said glass, glass-ceramic, or ceramic body; and (c) firing said body to about 700°–950° C. in a non-oxidizing or inert environment for a sufficient length of time to cause said frit to flow and produce a smooth homogeneous coating.

2. A method according to claim 1 wherein said inert environment is a nitrogen atmosphere.

* * * * *